United States Patent [19]

Lombardi et al.

[11] 4,194,476
[45] Mar. 25, 1980

[54] DEVICE FOR FEEDING OTTO CYCLE ENGINES WITH LEAN COMBUSTIBLE MIXTURES

[75] Inventors: Claudio Lombardi, Alessandria; Lorenzo Belletti, Turin, both of Italy

[73] Assignee: Fiat Societa per Azioni, Turin, Italy

[21] Appl. No.: 913,157

[22] Filed: Jun. 6, 1978

[30] Foreign Application Priority Data

Jun. 9, 1977 [IT] Italy .................. 68336 A/77
Mar. 30, 1978 [IT] Italy .................. 67702 A/78

[51] Int. Cl.² ........................... F02M 31/00
[52] U.S. Cl. ..................... 123/122 H; 123/122 A; 123/122 AA; 123/122 F; 261/144; 261/145; 261/142
[58] Field of Search ........ 123/122 F, 122 A, 122 AA, 123/127, 133, 122 H; 261/144, 145, 142, 41 D

[56] References Cited

U.S. PATENT DOCUMENTS

| 3,139,874 | 7/1964 | Krein | 123/122 A |
|---|---|---|---|
| 3,554,174 | 1/1971 | Clawson | 123/122 A |
| 4,151,820 | 5/1979 | Furucz | 123/122 A |

FOREIGN PATENT DOCUMENTS 1240518  7/1971  United Kingdom ............ 123/122 AA Primary Examiner—Ronald H. Lazarus
Attorney, Agent, or Firm—Sughrue, Rothwell, Mion, Zinn and Macpeak

[57] ABSTRACT

Lean air/fuel mixture is supplied to the induction manifold of an Otto cycle engine through a heat exchanger heated by engine exhaust gases under normal running conditions, and under idling conditions mixture is supplied to an auxiliary induction manifold solely through an auxiliary duct. The auxiliary duct is wound with an electrical resistive heating element to preheat the mixture upon cold-starting of the engine for a time, typically 30–40 seconds, determined by a timer switch.

6 Claims, 3 Drawing Figures

DEVICE FOR FEEDING OTTO CYCLE ENGINES WITH LEAN COMBUSTIBLE MIXTURES

BACKGROUND OF THE INVENTION

The present invention relates to devices for feeding Otto cycle engines with lean combustible mixtures.

It is known to feed air-fuel mixture from the carburettor to the cylinders of a multicylinder spark ignition engine through an induction manifold and through a heat exchanger, in which the mixture is preheated by hot engine exhaust gases, interposed between the mixture outlet of the carburettor and the induction manifold. The use of a heat exchanger in such devices makes it possible to use lean mixtures whilst the engine is running at speed, in order to reduce the amount of atmospheric pollution by the engine exhaust gases. Such devices do not, however, resolve the problems associated with the use of lean mixtures, particularly on cold-starting and the successive transitionary phase of cold-running of the engine.

An object of the present invention is to provide a lean mixture feeding device which avoids the aforesaid problems.

SUMMARY OF THE INVENTION

According to the present invention there is provided a device for feeding air/fuel mixture to a multicylinder spark ignition Otto cycle engine having a main induction manifold connected at one end to an outlet pipe of a carburettor and communicating with induction pipes of the engine, the device comprising a heat exchanger, through which engine exhaust gases may flow, interposed between the outlet pipe of the carburettor and the induction manifold to preheat mixture fed to the engine, an auxiliary induction manifold, adjacent the main induction manifold, having outlet pipes communicating with the said induction pipes, an auxiliary pipe connecting the said auxiliary manifold to the carburettor, an electrical resistance heating element arranged for heating said auxiliary pipe, means for feeding combustible mixture from the carburettor in the idling state of the engine only through the said auxiliary pipe, and a timer switch for connecting an electrical supply circuit to the resistance heating element for a predetermined time interval following operation of said switch.

BRIEF DESCRIPTION OF THE DRAWINGS

The invention will be further described, by way of non-limiting example, with reference to the accompanying drawings, in which.

DETAILED DESCRIPTION

Figure 1:
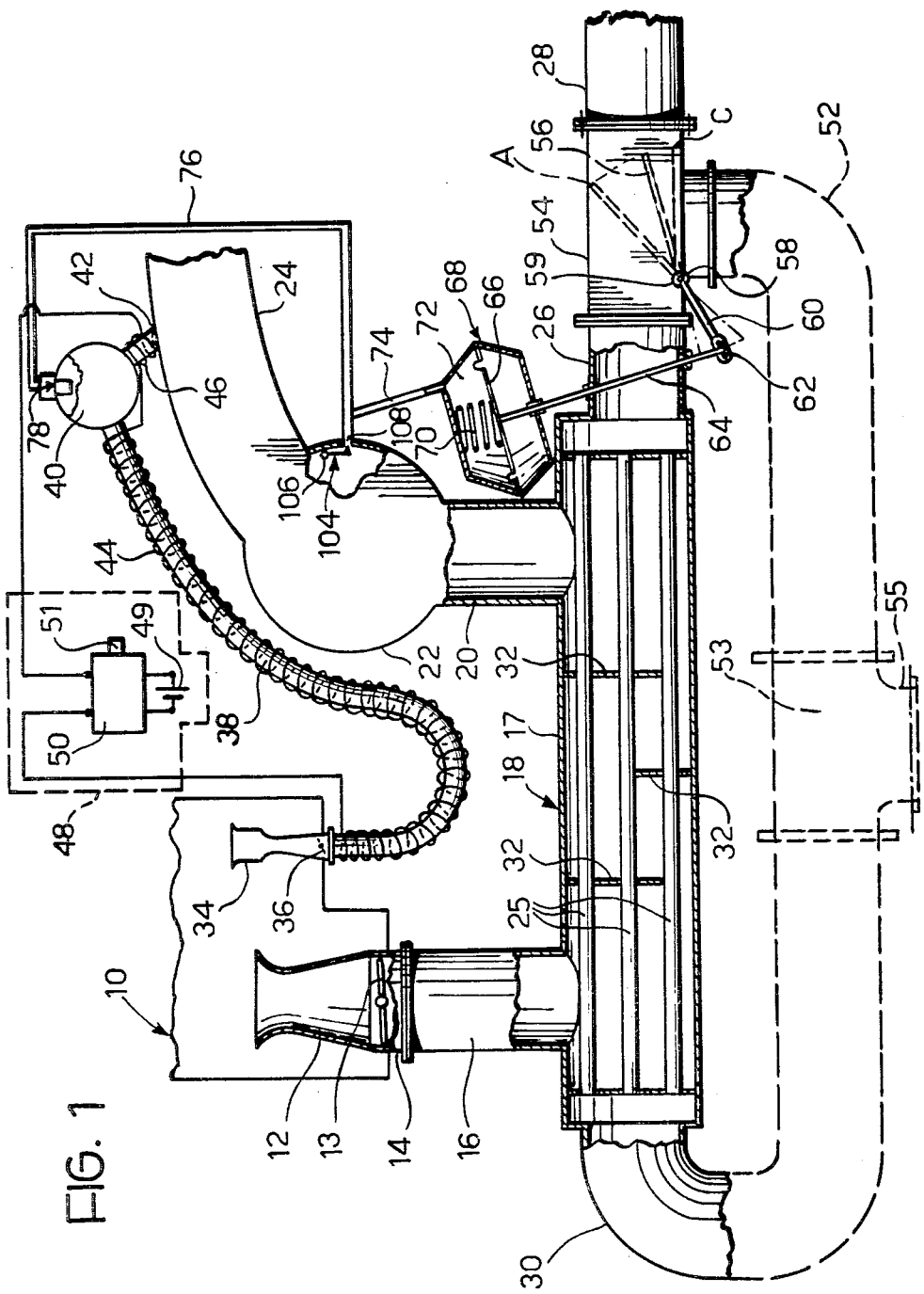
FIG. 1 is a diagrammatic side elevation, partly cut away in section, of a first embodiment of a device according to the invention.

Referring to FIG. 1, reference numeral 10 indicates a carburettor of the twin body kind, comprising a main body 12 provided with a main throttle valve 13 and an outlet pipe 14 connected via a pipe 16, a heat exchanger 18 and a pipe 20 to an induction manifold 22. p The induction manifold 22 communicates in a known way via induction pipes 24, only one of which is illustrated in the drawing, with the cylinder inlets of a multicylinder internal combustion Otto cycle engine with spark ignition, not shown.

The heat exchanger 18 comprises an elongate casing 17 containing a plurality of axial tubes 25 each communicating at one end with an inlet union 26 connected to an inlet pipe 28 which delivers hot exhaust gases from the exhaust manifold (not shown) of the engine, and at the opposite end with an outlet pipe 30 for discharging the exhaust gases into the atmosphere. The heat exchanger 18 is also provided internally with a plurality of transverse baffles 32 the purpose of which is to render tortuous the flow path of the air-fuel combustible mixture which passes through the casing 17 of the exchanger 18, so as to increase heat exchange between the hot exhaust gases which flow through the tubes 25 and this combustible mixture.

The carburettor 10 further comprises an auxiliary body 34, provided with an auxiliary throttle valve 36 and connected via an auxiliary pipe 38 to an auxiliary induction manifold 40. The auxiliary throttle valve 36 is connected to the main throttle valve 13 via a linkage or transmission, not shown, of the kind normally used in twin-body carburettors. This transmission is so arranged that when the main throttle valve 13 is closed, then the auxiliary throttle valve 36 is in the position corresponding to starting and idle running of the engine. The auxiliary induction manifold 40 is positioned adjacent the main induction manifold 22 and is connected, via outlet pipes 42, with each of the induction pipes 24 of the main induction manifold 22.

The auxiliary pipe 38 and the outlet pipes 42 are provided with respective externally wound electrical resistance heating coils 44 and 46 connected to an electrical heating control circuit 48 supplied from a battery 49. The circuit 48 includes a timer switch 50, indicated schematically. The timer switch 50 is normally open and can be closed by depression of a manual push-button 51 whereupon the switch 50 remains closed, reopening after a predetermined time interval, for example 30 or 40 seconds.

A by-pass pipe 52 is connected at one end to a pipe section 54 interposed between the heat exchanger inlet union 26 and the exhaust gas inlet pipe 28. The other end of the by-pass pipe 52 is connected to the exhaust gas outlet pipe 30 of the heat exchanger 18 via a T joint 53 which has a discharge outlet 55 for connection to the rest of the exhaust system and silencer of the engine, not shown.

Inside the pipe section 54 there is housed a pivoted shutter valve 56 pivoted at one of its edges by means of a pivot pin 58 rotatable in a bush 59 mounted on one side of the pipe section 54 immediately adjacent and downstream of the by-pass pipe 52. The shutter valve 56 is movable between a position A, shown in FIG. 1 by broken lines, in which it closes off communication between the exhaust gas inlet pipe 28 and the inlet union 26, and a position C, also shown by a broken line, in which the said valve 56 rests on the lower part of the pipe section 54, closing off the by-pass pipe 52 so as to allow all the exhaust gases delivered through the inlet pipe 28 to flow into the tubes 25 of the heat exchanger 18. An intermediate position of the shutter valve 56 is also indicated.

The pivot pin 58 has one end projecting outside the pipe section 54 and connected externally of the section 54 to one end of a lever 60, the opposite end of which has an axial slot 62 within which one end of a control rod 64 slides. The opposite end of the control rod 64 is connected to the centre of a diaphragm 66 anchored peripherally within a vacuum capsule 68.

A helical spring 70 is housed within a control chamber 72 of the capsule 68 and reacts resiliently between the diaphragm 66 and an end wall of the said capsule 68. The control chamber 72 is connected, via a tube 74, to a tube 76. One end of the tube 76 communicates with a thermostatic bleed valve 78 attached to the auxiliary induction manifold 40.

Figure 2:
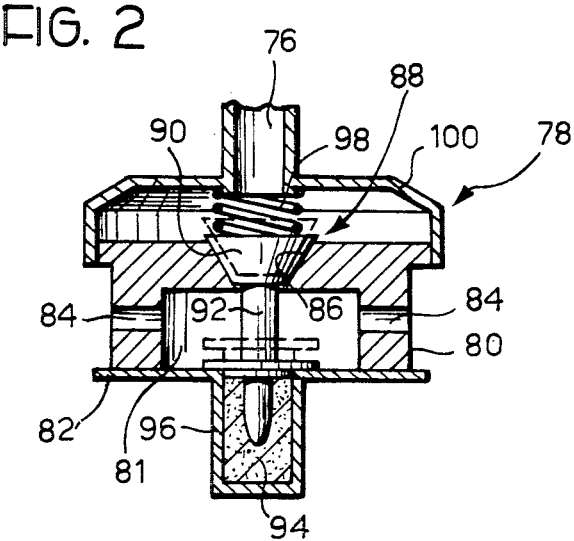
FIG. 2 is a cross-section on an enlarged scale of a thermostatic valve forming part of the device illustrated in FIG. 1.

The thermostatic valve 78, illustrated in detail in FIG. 2, comprises a hollow body 80 provided with a baseplate 82 for fixing it on to the outer wall of the auxiliary induction manifold 40. The body 80 is provided with lateral vent holes 84 through which the internal cavity 81 of the body 80 communicates with the atmosphere and has a frusto-conical valve seat 86 surrounding an aperture in the upper wall of the body 80.

A valve member 88 is movable axially within the body 80 and is provided with a frusto-conical head 90 cooperating with the valve seat 86. The valve head 90 is fixed coaxially to a stem 92, which constitutes a movable element of a thermostatic actuator comprising, in known manner, a casing 96, located within the auxiliary induction manifold 40, and filled with a material 94 of high thermal expansion coefficient, with a wax base. A helical spring 98 reacts resiliently between the valve head 90 and the inside wall of a cover 100 fixed to the body 80 and connected to the tube 76, which communicates with the internal space defined by the body 80 and cover 100.

The thermostatic valve 78 controls communication between the tube 76 and the atmosphere, placing one end of the tube 76 in communication with the atmosphere when the temperature inside the auxiliary manifold 40 exceeds a predetermined value, at which the valve head 90 is lifted from the seat 86, placing the tube in communication with the vent holes 84. The other end of the tube 76, which is connected to the main induction manifold 22, communicates with the manifold 22 through a thermostatic valve 104 housed within the induction manifold 22. The thermostatic valve 104 consists of a bimetallic strip anchored at one end at 106 and provided at its free end with a substantially conical tip 108 placed in correspondence with the inlet mouth of the tube 76 within the manifold 22. The tip 108 fits into the mouth of the tube 76, to an extent dependent upon the thermal distortion of the bimetallic strip, and closes off communication between the tube 76 and the main induction manifold 22 when the temperature inside the manifold 22 exceeds a predetermined value.

The operation of the illustrated device according to the invention will now be described.

Before starting the engine from cold the driver presses the button 51 so as to close the electric circuit 48 and commence heating of the pipes 38 and 42. As soon as the engine starts, the main throttle valve 13 is closed and the auxiliary throttle valve 36 of the auxiliary body 34 of the carburettor 10 is in the position corresponding to idling of the engine. Upon starting of the engine air/fuel mixture flows through the auxiliary pipe 38 into the auxiliary manifold 40. From the manifold 40 the mixture flows into the induction pipes 24 of the engine via the outlet pipes 42. The electrical resistance heating coils 44 and 46 heat the pipe 38 and the outlet pipes 42, so that the mixture coming from the secondary body 34 of the carburettor 10 is preheated before entering the induction pipes 24, allowing the use of a lean mixture in this operating regime of the engine.

After 30 or 40 seconds the timer switch 50 interrupts the flow of current through the resistances 44 and 46. Depression of the vehicle accelerator pedal induces opening of the throttle valve 13 and the mixture delivered from the main body 12 of the carburettor reaches the engine through the pipe 16, the heat exchanger 18, the pipe 20, the main induction manifold 22 and the induction pipes 24. In this regime the thermostatic bleed valve 78 remains closed. The pressure drop in the main induction manifold 22 is therefore transmitted to the control chamber 72 of the vacuum capsule 68 through the tubes 76 and 74. Consequently the diaphragm 66 is flexed upwardly so as to draw the control rod 64 upwards and, by means of the lever 60, to hold the shutter valve 56 in the position C. In this position the valve 56 closes the by-pass pipe 52, so that the exhaust gases delivered through the exhaust gas inlet pipe 28 flow through the tubes 25 of the heat exchanger 18 before being discharged into the atmosphere through the outlet pipe 30 and the engine exhaust system. The air/fuel mixture which passes through the body 17 of the heat exchanger 18 is therefore preheated by heat exchange with the engine exhaust gases flowing through the axial pipes 25.

The resulting heating of the thermostatic valve 104 situated within the main induction manifold 22 eventually causes deflection of the bimetallic strip of the said valve 104, by an amount proportional to the temperature of the mixture, moving the conical tip 108 into the mouth of the tube 76, until the latter is completely closed.

The magnitude of the pressure drop within the control chamber 72 of the capsule 68 diminishes, therefore, as a function of the temperature of the mixture, thus regulating the degree of closure of the shutter valve 56 and consequently the flow of hot exhaust gases through the heat exchanger 18, the said exhaust gas flow diminishing as the temperature of the air/fuel mixture increases.

The portions of the air/fuel mixture which reach the auxiliary induction manifold 40 and, after preheating in the heat exchanger 18, the main induction manifold 22, combine within the induction pipes 24 and enter the combustion chambers of the cylinders at temperatures such as to allow efficient operation of the engine.

During idle running of the engine in the initial cold-running phase of operation, that is, when the electric circuit 48 is activated by closure of the timer switch 50 and when the main throttle valve 13 of the main carburettor body 14 is closed, the only mixture delivered to the engine is that supplied from the auxiliary body 34 of the carburettor 10 through the heated auxiliary pipe 38.

When the temperature of the air/fuel mixture flowing through the auxiliary induction manifold 40 exceeds a predetermined value, then the thermostatic bleed valve 78 opens, venting the tube 76 and the control chamber 72 of the capsule 78 to the atmosphere. The diaphragm 64 thereupon deflects downwards under the influence of the spring 70, inducing via the control rod 64 and the lever 60, rotation of the shutter valve 56 into the end position shown as A, in which the valve 56 prevents entry of the exhaust gases from the inlet pipe 28 into the heat exchanger 18, the exhaust gases flowing through the by-pass pipe 52 into the discharge outlet 55.

Figure 3:
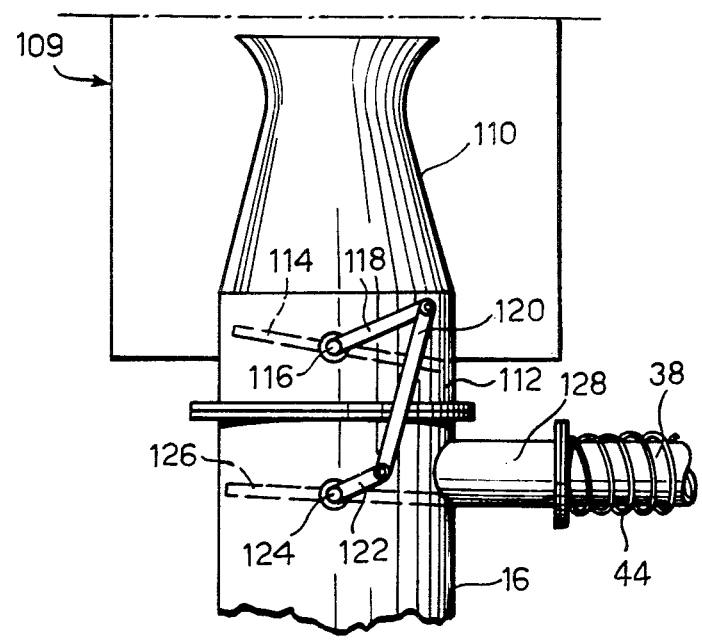
FIG. 3 is a diagrammatic side view elevation, on an enlarged scale, of a variant of part of the device illustrated in FIG. 1.

The variant illustrated in FIG. 3 differs from the embodiment previously described in that, instead of a twin body carburettor, it uses a carburettor 109 with a single body 110, provided with an outlet pipe 112 connected via the pipe 16 to the inlet of a heat exchanger, which may be identical to the heat exchanger 18 illustrated in FIG. 1.

The body 110 is provided with a main throttle valve 114 housed within the outlet pipe 112 and rotatably mounted upon a shaft 116. On to the shaft 116 there is fixed, outside the pipe 112, one end of a lever arm 118 the other end of which is articulated to one end of a link 120. The other end of the link 120 is articulated to one end of a lever arm 122, the length of which is less than that of the lever arm 118. The opposite end of the lever arm 122 is fixed to one end of a pivot pin 124 projecting outside the inlet end portion of the pipe 16 and supporting within the pipe an auxiliary throttle valve 126, downstream of the main throttle valve 114.

The pipe 16 is provided, in the section between the auxiliary throttle valve 126 and the outlet pipe 112 of the carburettor body 110, with a lateral pipe union 128 to which the auxiliary pipe 38 is connected. As in the embodiment of FIG. 1, the pipe 38 is connected to an auxiliary induction manifold and is wound externally with an electrical heating coil 44.

The other parts of the feed device are not illustrated in FIG. 3, since they are identical with those illustrated and described with references to FIG. 1.

In operation, when the main throttle valve 114 is in the position shown in broken outline, corresponding to idle running of the engine, the auxiliary throttle valve 126 is held in the closed position by the linkage 118, 120, 122. The air/fuel mixture delivered from the body 110 of the carburettor 10 through the throttle valve 114 therefore flows through the lateral pipe union 128 and the heated auxiliary pipe 38 into the engine. When the engine requires more power, the throttle valve 114 is opened, causing, through the linkage 118, 120 and 122, opening of the auxiliary throttle valve 126. Air/fuel mixture is therefore able to flow to the engine through the pipe 16.

The various operating phases of the device shown in FIG. 3 are entirely analagous to those previously described with reference to FIG. 1.

We claim:

1. Device for feeding air/fuel mixture to a multicylinder spark ignition Otto cycle engine, comprising a carburettor, a main induction manifold, a carburettor outlet pipe connected to said main induction manifold, induction pipes communicating with said main induction manifold, a heat exchanger having passages for through flow of engine exhaust gases, the heat exchanger being interposed between said carburettor outlet pipe and said main induction manifold to preheat mixture fed to the engine, wherein the improvements comprise:
    an auxiliary induction manifold adjacent said main induction manifold and having outlet pipes communicating with the said induction pipes;
    an auxiliary pipe connecting the said auxiliary induction manifold to said carburettor;
    an electrical resistance heating element associated with said auxiliary pipe;
    means for feeding combustible mixture from said carburettor in the idling state of the engine only through said auxiliary pipe, and
    a timer switch for energising said resistance heating element for a predetermined time interval following operation of said switch.

2. Device as defined in claim 1 wherein the carburettor is of the twin body kind having a main body and an auxiliary body, the said outlet pipe connecting said main body to the main induction manifold through the heat exchanger, and said auxiliary body having an outlet pipe connected to the auxiliary induction manifold through the said auxiliary pipe, said main and auxiliary bodies having associated main and auxiliary throttle valves respectively, the main throttle valve being closed when the auxiliary throttle valve is in a position corresponding to idle running of the engine.

3. Device as defined in claim 1, wherein the carburettor is of the single body kind having a main throttle valve, the said outlet pipe being connected to said heat exchanger via a pipe which has a branched connection to the said auxiliary pipe and which has, downstream of said branched connection, an auxiliary throttle valve, linkage means interconnecting said main and auxiliary throttle valves to keep said auxiliary throttle valve closed when said main throttle valve is in the position corresponding to idling of the engine, said linkage means opening said auxiliary throttle valve simultaneously with the opening of said main throttle valve.

4. Device as defined in claim 1, wherein the outlet pipes which connect the auxiliary manifold to each of the induction pipes of the main induction manifold have respective electrical resistance heating elements associated therewith and connected to said timer switch.

5. Device as defined in claim 1, wherein the said heat exchanger communicates at one end with an exhaust gas inlet pipe for connection to the exhaust manifold of the engine to receive engine exhaust gases therefrom and communicates at the other end with an exhaust gas outlet pipe for discharging the exhaust gases into the atmosphere, and including a by-pass pipe connecting said exhaust gas inlet pipe, upstream of the heat exchanger, with said exhaust gas outlet pipe downstream of the heat exchanger, valve means for controlling the relative proportion of exhaust gases flowing through the said heat exchanger and through said by-pass pipe, and control means controlling said valve means, said control means being sensitive to the temperature of the combustible mixture in the main induction manifold and in the auxiliary induction manifold.

6. Device as defined in claim 5, wherein said control means comprise a pneumatic actuator having a control chamber and including a tube connecting said control chamber to the auxiliary induction manifold and to the main induction manifold, a first thermostatic valve controlling communication between said tube and said auxiliary manifold, said first thermostatic valve being adapted to vent said tube to the atmosphere when the temperature within said auxiliary manifold exceeds a predetermined value, and a second thermostatic valve controlling communication between said tube and the main induction manifold, said second thermostatic valve being responsive to the temperature within said main induction manifold.

* * * * *